(12) United States Patent
Gattegno et al.

(10) Patent No.: US 8,332,370 B2
(45) Date of Patent: Dec. 11, 2012

(54) MAINTAINING COMMONLY NAMED CLIENT-SPECIFIC FILE CONTENT IN HARD DISK DRIVE EMULATION

(75) Inventors: Yves Gattegno, l'Haÿ les Roses (FR); Julien Ropé, VilleJuif (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1622 days.

(21) Appl. No.: 11/382,304

(22) Filed: May 9, 2006

(65) Prior Publication Data

US 2007/0266027 A1    Nov. 15, 2007

(51) Int. Cl.
*G06F 7/00*    (2006.01)
*G06F 17/00*    (2006.01)
(52) U.S. Cl. ....................................... 707/695
(58) Field of Classification Search ................ 707/1–10, 707/695, 638; 709/213; 715/764
See application file for complete search history.

(56) References Cited

U.S. PATENT DOCUMENTS

| 6,538,669 B1 * | 3/2003 | Lagueux et al. ............ 715/764 |
| 6,553,408 B1 * | 4/2003 | Merrell et al. ............. 709/213 |
| 7,865,579 B2 | 1/2011 | Birse et al. |
| 2002/0069335 A1 | 6/2002 | Flynn, Jr. |
| 2002/0147862 A1 | 10/2002 | Traut et al. |
| 2004/0111250 A1 | 6/2004 | Hensley |

FOREIGN PATENT DOCUMENTS

WO    WO 2005101202    10/2005

OTHER PUBLICATIONS

EPO, Extended EP Search Report, Mar. 18, 2011, App No. 07762066.4-2211 12016515, PCT/US2007068583, filed May 9, 2007.

* cited by examiner

Primary Examiner — Usmaan Saeed
Assistant Examiner — Navneet K Ahluwalia

(57) ABSTRACT

A data processing network has a virtual hard drive emulator and client terminals that share a virtual disk image. Client-specific read-write versions of selected files or directories are supported. All clients access the client-specific versions using the same name and address identifiers (for example, the same file name for a given configuration file), but each client has an exclusive version. A file ID distinguishes respective clients. These files are maintained alongside other files of other types and attributes. The selection of files to be client-specific can be predetermined, or a client-specific version of a file can be generated if the client executes a write operation to a client-specific file or area, the written data containing data read by the client in any of memory area available to the clients (RAM, Virtual Disk Drive, Hard Disk drive etc.). The technique supports customization while maximizing administrative control of operating system versions and minimizing redundant storage. File access for client terminals can be made close to systems having local hard drives.

21 Claims, 5 Drawing Sheets

MAINTAINING COMMONLY NAMED CLIENT-SPECIFIC FILE CONTENT IN HARD DISK DRIVE EMULATION

FIELD OF THE INVENTION

The invention concerns emulating read-write memory operations in a data processing environment with multiple operational entities (termed "clients," exemplified by software processes, terminal devices or users). All the client entities identify a given file in the same way, for example by a directory location and file name. However client-specific versions are established. In this way, all the clients can function using the same operational programs to call for and manipulate the same files by name. But the emulation system actually serves the clients with the versions that are specific to the client. This enables the clients to function independently while using the same operating system and appearing to call for the same files.

The invention can be applied to a subset of memory contents initially designated as shareable or all the contents in a given directory or volume or other subset of memory. The contents can be local memory, e.g., associated with a standalone terminal, or in a network-coupled terminal device or network-accessible file server. In different embodiments, the client specific data can be more or less persistent or temporary. The invention is particularly useful in a thin client computing environment configured to have minimal storage redundancy and minimal allocation of resources such as nonvolatile memory at the client terminal devices.

PRIOR ART

It is advantageous in some instances to keep certain stored data safe against changes. In some instances it is unavoidable that the stored values cannot be changed, because the medium of storage is not changeable. An example is an optical DVD write-once-read-many (WORM) memory medium. Another example is stored values that are designated as read-only by flag bits honored by software processes (at least at some level of security), such as files having attributes designating read-only files stored on a hard drive storage medium. A third possibility is memory that may be read-write, but writing is inconvenient or slow, such as flash programmable read-only memory (PROM).

Read-only data images can be useful. Among other reasons, read-only file contents might be used as a clean starting data image from which to initialize. In a multiple user context, read-only file contents provide a common set of values that are not subject to changes made by individual users or processes that affect other users.

Data processing arrangements are possible wherein multiple processes share stored files and their contents. Multiple clients or processes might run locally on a terminal associated with the storage medium for the shared files, such as a hard disk drive. The clients or processes also might access files remotely over a communications network.

In obtaining access to stored files, attention is needed in addressing the stored memory contents. For a read-write file situation, attention also is needed to arbitrating access, so one process cannot over-write changes made by another process. In a read-only file situation, addressing remains an issue but there is no risk of over-writing changes. Addressing might involve the use of a file name and directory tree or path designation that leads to a uniquely addressable file name and location of sectors. One or more driver processes may be used to interface between operating processes and the controller and associated memory.

A read-only memory image can be shared by multiple processes. All processes are free to read the contents and obtain the same data from a read operation. Multiple clients or processes may advantageously be provided with access to a standardized memory image in this way. For example, multiple users of a terminal may need to share an operating system that is the same for all the users. Multiple terminal devices may need to share an operating system that each terminal can download in a pristine or "clean" condition from a server when the terminal is initialized. A copy of operating system files on a CD or DVD ROM can be reproduced identically and distributed for use by numerous users or processes or terminals, each of which will have identical arrangements so as to facilitate administration and service.

However challenges arise because it is highly advantageous, and for some purposes it is absolutely necessary, to provide at least certain values that are unique to individual processes or terminals or users, even if the operating system image is otherwise identical for all of them.

For example, each terminal device on a network needs to have its own unique identity, e.g., to be associated, when active, with a unique network address. Each user of a terminal may need to distinctly customized sets of rights, preferences, passwords and the like. What is needed is an optimal way to obtain the benefits of standardized content in read-only memory, while efficiently reserving ways to manage variations that preferably are changeable, and are specific to particular users or terminals or processes.

A known technique, the "file system filter," can be employed as an interface process operating at the file level to intercept read/write requests and to customize the file contents on a per-client basis as the read and write processes occur. The technique imposes a file system filter process onto client operations. It would be advantageous, especially in a system having data designated as shared, where the data must then usually be protected against overwriting (permanently or temporarily), to enable customization that is transparent to the client, and from the client perspective truly emulates the operations of a local read/write hard disk that the client does not share with other clients. The need is to maximize the sharing of operating system files and the like that are the same for all clients, while efficiently providing for client specific files enabling the clients to operate independently.

Commonly-owned PCT application WO2005101202 discloses the possibility of client specific versions of data in write overlays. Once established, an overlay replica is used in lieu of the original data file (or other incremental data quantity), for read operations, data modification steps and subsequent write operations. Overlays can be established preliminarily, in anticipation of a data write operation, or on the fly when a write operation occurs, and is automatically intercepted to the overlay. This is not done in connection with on demand file transfer as disclosed herein. The prior art technique is an automated function wherein the overlay substitutes for the original media so as to provide a way to sustain data-write operations (and subsequent access to the written data) in a situation where write operations on the original media are not possible or perhaps are simply inconvenient. Thus in the prior art as represented by WO2005101202, it is not possible to distinguish among written data files. All written data are written to overlays, including swap file, temporary files, etc., in an automated way.

SUMMARY

An important goal of the present technique is to provide client-specific data transfer capabilities only relying on functions provided by an emulated hard disk drive (Virtual Disk Drive also called hereafter VDD), enabling each client to process the very same set of instructions but in the process to access their specific data. This makes the transfer client-specific data, usually client-specific files, available without the need of anything but capabilities to communicate with emulated hard disk drive(s).

One aspect of the present technique is to balance the idea of providing a substantially shared or standardized or commonly accessible data image, with the idea of providing data values that are specific to processes or terminals or users (generally "clients" or "operational entities"). The shared image has benefits of standardized operations, convenient administration and the like. The client-specific values permit distinct and independent operations similar to what might be expected if the data image was not shared.

The process provides an interface by which the client can issue read and write operations directed to the client specific data (e.g., the same file data that all the clients use to access their own functionally comparable versions of the data in that file). The client-specific version preferably stores values that are specific to the client and may be unique. The overall group of clients can operate a standard operating system that is shared and not changeable, while at the same time serving the clients' needs for certain values that are unique to the client and without dictating any special rules of operation on the clients other than using the provided interface to insert steps that will read or write data in the storage area corresponding to each client-specific data. The overall group of clients can also operate a standard operating system of files that are shared and are not to be changeable but in which write operations are made possible (for instance using write-overlays that are RAM based or temporary write-cache). This aspect is useful for modern operating systems that generally need some writeable space. The location of such a writable space is not always easily customizable or easy to disable. For instance, it is not possible to set an OS that uses Microsoft Windows XP kernel in such a way that it does not try frequently to store the total registry (System, User, etc.) to a writeable storage. Note that providing a write-overlay is not an aspect of the present technique. Yet, the present technique can be used in conjunction with write-overlay techniques.

The invention is useful for two or more processes sharing a set of data including data designated as initially shareable, and which data can be rendered client specific according to the invention. The client-specific data are useful to provide individual values in an otherwise read-only operating system environment. They are also advantageous to enable logical read-write behavior for processes that are actually operating in a logically or physically "protected" (read-only) environment.

The protected data can be kept on a client system or on a network server. The data can be stored (originally) in inherent read-only media (e.g., optical DVD) or on media such as flash PROM that is writable, but not conveniently so, or the data can be stored on read-write media and simply designated as protected as described herein.

The invention has advantageous application to network data processing techniques wherein multiple network terminals or "clients" are provided access to standardized services and/or shared programming and data storage facilities provided to plural clients via one or more shared network servers. The hardware requirements at the client terminal can be minimal, especially in a "thin client" application where terminals need not have a local hard disk drive. Client terminals have access to the data storage capacity of the server(s).

Operational entities such as terminal devices or operating processes on a terminal device, or processes servicing a given user, are arranged to share access to the same data image, for instance via distribution of copies of the data image. This can be certain file names, directories, subdirectories or identified data storage blocks (e.g., sectors). Such entities are provided with the capability to establish and maintain specific versions of files or sectors. Plural entities share memory content that advantageously can be protected against writings, emulating a system wherein each client or other entity has a private storage area, devoted to storage of content that may be substantially redundant with content that is similarly kept by other entities on their own private storage area.

The invention useful, for example, in thin client computer network systems, as well as other applications that benefit from minimizing redundancy of data storage and sharing of substantially identical copies of stored values. Thin client systems are characterized by distributed client terminals that have relatively limited data storage capacity at the client terminal. Thin client networks offer computing power and storage capacity that is comparable to a network comprising clients with extensive local hard drive capacity. But computing power and/or storage is concentrated at servers remote from the client terminals, accessed using network data communications between the terminals and the servers. The non-volatile portion of client terminal memory may be quite limited, e.g., only to BIOS/firmware sufficient to boot from a server. Considerable administrative and cost savings advantages can be realized in a thin client network, while also benefiting from operating system stability and security.

The "thinness" of a client network might be more or less extreme and might be more or less broadly applied to all terminals having network access. The point is that in a thin client network, some of the storage or computational power that might be provided at terminals is instead provided at the server, as opposed to the clients, who access that power via network exchanges with the server.

Thin client terminals need not be equipped with large hard drives or redundant copies of executable code. In some embodiments, distributed terminals might have local flash memory to initialize and commence operation of the terminal in conjunction with a local random access memory serving the processor of the terminal. The typical thin client terminal can have no hard disk drive. The on-board operating system has startup routines sufficient to invoke a network interface device that employs Dynamic Host Configuration Protocol (DHCP) to obtain a network address. Network IP (Internet Protocol) settings are established for communications with one or more network servers. The client terminal can be arranged to obtain executable code by downloading an operating system from a server (to boot from the server). Applications programs may be downloaded from the server on demand or from storage media associated with the server(s). In an alternative and perhaps even thinner client network, the client terminals might be configured to establish network communications with a server and then to operate substantially as input/output interface devices between their human operators and remote server where the routines actually are executed. In all these examples, the terminals can be inexpensive while being relatively safe from being made obsolete by the release of faster or more capable computers. Hardware and software improvements are made efficiently and relatively less expensively by upgrading the servers.

Although thin client terminals may lack hard drives, it is advantageous if operators of the terminals perceive the terminals to operate in the same way as terminals with local hard drives. Preferably, applications programs can access network drives in substantially the same way that local drives are accessed. In a typical LAN or WAN or broadband Internet network, read/write data communications over the network to a remote logical disk drive Volume over the network are relatively fast. Unless there is substantial network congestion, a network read/write transfer may take about the same time from an operator's perspective as a transfer involving a local hard drive. If so, the difference from an operator's standpoint is mainly only whether the targeted volume in the transfer is addressed at one server or another. The location of the storage media is unimportant.

One benefit of a thin client network as described is that any number of client terminals can load or boot from the same operating system image or copies of applications programs stored at the server. If an administrator installs a revision to the operating system or to an applications program, all the user terminals configured to use that operating system or program will benefit without the need to upgrade the software at each terminal. A server might support various operating systems, various different revisions and various applications suites. Any of them might be revised or upgraded at the server level to benefit all authorized users.

In a thin client computer network configuration available from Neoware, Inc., a system disk can be used by multiple client terminals to initialize or bootstrap load using the same virtual networked system disk. The virtual networked system disk is shared by the clients using a Network Virtual Disk "NVD" protocol. The NVD protocol is basically a user datagram protocol (UDP) for disk read and write access to a virtual disk. A typical operation may be, for example to read or write a given number of sectors starting at an identified sector. The IP address for the UDP transmissions to and from the client are established by Dynamic Host Configuration Protocol, when the user terminals are initiated.

The IP address for the client in this client-server transaction are generally established on the fly when a client terminal is initialized, instead of being permanently assigned to the client terminal. Permanent IP address assignments are possible but are less efficient because terminals that are inactive (e.g., powered down) obviously don't need an IP address. If the client IP address is unknown and all the clients run the same virtual networked system disk image, then there would be a problem with using IP address to distinguish one client terminal from another over a time period that is longer than the time between initializations of the client terminal (when the IP address becomes an identifier that is unique to the client terminal until its next shutdown). Using client MAC address (Media Access Control address) such as Ethernet address, that is globally unique, is usually more efficient than using the client's IP addresses In some operating systems, there is a unique identifier associated with the terminal (regardless of current user), stored at the terminal in a nonvolatile register such as a hard disk (if the terminal has one) or a ROM or PROM or other medium. For example, in Windows, a terminal is assigned a "computer name." This unique identifier is needed to distinguish the terminal from other terminals.

A distinct and lasting identity for the client terminal might or might not be a crucial datum depending on the programming of the network. For example, if users have unique network user names and can log in at any terminal, it is the user name that perhaps should be used as a distinct identifier for some purposes.

In a case where client terminals share a disk image, it is necessary to manage access to data files so that changes are not overwritten and/or so that read operations by a given client are only allowed on files that are not currently being altered by another client, possibly producing anomalous results. In the case of read/write operations, it may be necessary for a given terminal to "open" a file, making that file unavailable to other users until closed.

Operating system images and applications programs that are made available to respective client terminals (or other operational entities) may not all be the same. It is necessary to distinguish among them. In so doing it is necessary to store at least some information that is specific to the terminal or the like. At a minimum, each terminal needs a unique identifier to be associated with a network address to effect network communications uniquely with a given terminal. Typically each terminal has an identifier such as a computer name or number that is stored locally in nonvolatile storage (e.g., in a flash memory). During DHCP protocol procedures, a network address might be obtained dynamically but the address can be associated with the unique identifier. In some networks, terminals are issued unique fixed TCP/IP addresses, which can function in the same way as a unique computer name. This unique identifier, however obtained, can cross reference information that is specifically associated with the terminal.

According to programmed particulars, information that is associated with uniquely identified terminals could involve various parameters. Examples of unique information are the current status of the terminal, the rights and authorizations of the terminal in a security hierarchy, identifications of users authorized to operate the terminal, software and media licenses that have been obtained for the terminal, user selected options that are to survive a terminal restart, remembered passwords, cookies, history files, and so forth.

One benefit of a networked system as described is that a number of thin client user terminals benefit from common use of the same software provided by the server based system. Upon initialization, all the terminals (or subsets of the terminals) may bootstrap load the same operating system image. The various terminals may download and run the same applications programs. Preferably this involves all the terminals using the same conventions for access, i.e., the same file names and disk Volume identifiers. It would be advantageous if the terminals also could share the same conventions to access files and information containing data that is unique or specific to individual terminals. However some provision needs to be made to distinguish the information that is specific to one terminal from the information that is specific to another.

One technique may be to store at the user terminal any information that is unique to the terminal. This is not wholly satisfactory, because it implies that the terminals are no longer all the same and subject to management by a system administrator without customization. Also, client terminals might not be equipped with hard drives or storage devices capable of read/write nonvolatile data storage. Flash memories and/or combinations of read-only memories and accompanying limited nonvolatile storage registers are possible, but it is unwieldy to use a flash memory for storage because writing to a flash memory is slow and it may be desirable to limit the extent to which terminal operating systems are allowed to be changed, for purposes of security and administrative convenience.

Certain operating systems support flash memories, such as the Microsoft Windows XP-Embedded system. In this and similar operating systems, any memory write operations during runtime are executed to a volatile memory overlay or copy, instead of to the flash memory. The overlay can be copied over the flash memory, during an orderly shutdown procedure. This permits changes made by writing to memory (namely to the overlay) to become "permanent" by writing to the flash memory, but only during orderly shutdown. As a result, operational changes to the operating system to be stored in flash memory, nonvolatile changes to user options, permanent identifiers such as computer name identifiers and similar permanent data must be sustained through an orderly shutdown in order to become permanent. That is, the process of fixing a value in nonvolatile memory requires cycling through a shutdown and restart, i.e., to reboot the terminal.

Although the invention is exemplified by a thin client network application, the advantages and benefits of the invention also can be realized in other sorts of system configurations characterized by the efficiency of sharing some stored data values while supporting at least a limited number of files or values that are specific to an operational entity. For example, operational entities that could benefit might be several users such as workers on different shifts, that share a single terminal. Such users can share most of the same executable software benefit from having stored information that is specific to the user, such as passwords, security authorizations, preferences and the like. According to the invention, the user-information can be generated and maintained from one or more shareable default files that are used to generate the client-specific (user-specific in this case) data.

Other operational entities that may benefit from the invention could be operational processes such as software programs that are members of suites of programs that share certain code or tables, one example being fonts. Although a standardized version is available and shareable, the processes can be permitted to customize the code or tables by means of the invention to generate a version in an storage area specific to the process, or even to gain access to data (for instance a specific font) that are not available to the other operational entities.

One aspect of the invention is efficient storage. There is minimal duplication of stored data values because the operational entities can share a copy (protected) up to the point that an entity changes the values (or perhaps an administrator changes values for the benefit of the entity), establishing a version that is specific to that entity. Another aspect is convenience of programming. Every operating entity (terminal, user, process or the like) can run the same shared system. The means of HDD emulation system make it possible for several client to access simultaneously the same data content (usually the data in the common emulated HDD image), using the same data addressing. We consider shareable the data that may be accessed (usually read) by several clients at the same time. This leads to a high level of system stability. Notwithstanding these benefits arising from uniformity, each of the operational entities can customize some data, in particular with respect to initially shareable files that can be established in client-specific versions, at least for certain designated files, that can be made exclusive to their respective clients, are accessible to their client under the same shared file name, but hold contents that are specific to the client and can differ from the contents of client-specific files held for other clients under the same shared file name. In other words, the client specific data addressing can be shared by several clients at the same time while the content of each client-specific set of data (for instance client-specific file) may be different from one client to another. Preferably, the client-specific files can be generated to the point of having one to one correspondence between entities (clients) and client-specific file contents or replicas, accessed by clients under the same name. However, it is also possible to have one or more replicas that classify the entities into a subset where entities that are members of the subset share a replica as a subset-specific file or table or the like.

An object is efficiently to manage a multi-entity system or procedure wherein a number of client computers, their users or their processes (operational entities) have shared access to the same data store. These entities may be individual entities or associated categories thereof, that share a data store. Although the data store is shared, after opening a file in a read/write procedure, each entity becomes coupled to a version of that file that is specific to the entity. This version can differ from versions of the same file to which other entities are coupled. Meanwhile, each of these entities can address and continue to address the data store as if there was only one such version.

In a terminal system serving multiple operational entities such as multiple users, the operating system preferably services the users in a customized way. In a server based system comprising volumes, directories, files or other memory units that are offered by a unit such as a file server to multiple terminals, users or similarly entities, the server based shared memory can emulate a system wherein each user has a complete copy of the memory image including the shared files and the user or terminal specific files or data of that user/terminal only.

In the inventive arrangement, data-read and data-write requests can be handled differently for certain data identifications (or volumes or directories or other memory units that are deemed to be shareable) so that such units can become client specific. The files (or directories or other units) when rendered client-specific can be addressed by their corresponding owner (operational entity) using the same file name, memory/storage address or directory tree or volume identifiers that were used all along. The same names and addresses also are used by other clients in addressing their own client-specific versions. As another scenario, certain file names might "exist" when requested by particular clients. These techniques allow the clients to operate from the same software image while at the same time having client-specific arrangements that can render the operations of the respective clients independent of one another.

Processes associated with the memory/storage interface of a local client terminal and/or processes running on a server system can handle the read/write requests to/from a shared network memory store to service file access requests. On a request according to our innovative interface, the process (drivers, server process etc.) direct memory access by the operational entities to their corresponding client-specific files for those files that are client specific. This can be accomplished by modifying the addressing or file name specifics to contain or refer in a cross reference table to a unique identification of the particular client.

The subject invention differs from a file system filter that might intercept and alter the contents of data during read/write requests at the file level, so as to customize file contents "on-the-fly" on a per-client basis. The invention does not require or rely on a file system filter process operating on the client side. Instead, the generation of a client-specific data area (during a first write operation on shared data) and later serving up of the same contents (when the same client processes a read operation) is transparent to the client. According to the invention, the load/read order of the standard operating system or application data read/write operations are adapted to point to the client specific data. Instead of customizing shared contents as in a file system filter, the invention adapts standardized data addressing steps undertaken by the clients to establish and use client specific data areas that are inserted into the stream of data flow in lieu of the originally addressed data.

According to one aspect, the invention can be implemented as a feature of an existing HDD emulation protocol. The existing protocol is modified to implement a new "open" command. All clients use the same addressing particulars to open files, including in a shared area. The inventive "open" function conditionally opens a data area that is specific to the client instead of an emulated HDD object, and serves the "open" command using the client specific file. The client specific file might have been previously created, for instance, after having been once written by the client to the opened file or data area. Alternatively, the client specific file could have been established prior to any write operation, for example by an administrator or as part of setting up a client configuration.

There are preferably at least four pertinent categories of data storage. A first category is locally stored data (on local HDD for instance) that is available to clients in a conventional manner and may have attributes permitting read-write access or read-only access as appropriate. A second category is data that are shared between several entities and should be protected against changes (temporarily or permanently), for instance a shared virtual disk drive. Writing to a data area of this category produces an overlay or new version that may contain changes. The overlays are the third category. This third category may be temporary or permanent or may have some intermediate level of persistence. According to an inventive aspect, a fourth category of stored data is data that has been made specific to a respective client. This fourth category comprises a plurality of data areas, each of which areas is owned by and normally is accessible only to the client(s) that "own(s)" the data area, for instance that originally executed a write operation that spawned a client-specific or "customized" version of the data area. The fourth category also can be made temporary or persistent or permanent as described.

The particulars of the resulting system are subject to variations depending on choices made as to whether various categories are read-write or read-only, whether changes shall be persistent to as to survive a reboot, etc. In some embodiments, such choices may be dictated by the type of storage media involved. According to the possible variations, there are resulting actions that may be permitted or precluded in a given embodiment. For instance, in an exemplary embodiment, there could be an original shared file, an overlay that may be volatile or persistent, and one or more client-specific versions of that file.

In an embodiment where an original data area (e.g., "file") is to remain unchanged, there can be two repositories for written versions that can be read or written, versus client-specific customized data that can be read and written only by the particular client that owns that data. The overlays might be volatile and the contents lost upon re-initialization. The customized data might also be volatile but can usefully be made to be persistent; the invention can be applied to each of these situations.

It is possible as described to establish the customized data by replication of an original file when attempting a write operation as described. However this technique is not absolutely necessary. The customized data need not be initially read or written from/to the overlay(s) or "common storage area" (for instance shared HDD image). The customized data can also be established in other ways, for example, as an administration step when setting up a terminal or user or other client.

But the inventive load/read steps according to the invention make it possible to use the customized data in various useful ways. In one example, customized data for a client may be read from a repository (and optionally processed in some way);

the customized data are copied into a "logical disk drive" so as to over-write functionally corresponding commonly-shared non customized data. This may involve copying into an overlay used to represent the contents of the logical disk drive.

When an operational entity (e.g., an operating system component or a software application process) requests to read the data previously customized, it is provided with such data from the logical disk drive (which is a copy of the data read from the repository and copied into the logical diskdrive, namely in the overlay associated to the pair client/logical disk drive).

At shutdown (and assuming that the customized data repository is writable), the customized data are read from the overlay and copied back to overwrite the correct area in the repository. Thus, if the data had been modified, such modifications are now set and will be copied into the logical disk drive overlay the next time that the customized data are read from the repository, e.g., at a next initialization of these step.

One of the advantages obtained according to the invention is that file transfers can be supported very early in the boot process of the client, for example at a point when the layers needed to perform conventional file transfers (CIFS/SMB, FTP, NFS, etc.) may not yet be available. Having file transfer capabilities very early in the boot process is particularly beneficial because some data that advantageously are customized to enable client specific independent operations may be used early in the boot process and said customization will then not require a reboot; furthermore, a reboot would be inefficient if the changes are lost at each boot.

The invention can easily and efficiently support simple scripts or programs that use this file transfer capability. Although clients may seek to open a given file and use the same naming and addressing conventions to do so, the open file request according to the invention can actually open a different file for each client. This per-client customization feature is accomplished directly by the process of the invention. This makes it possible for several clients that read the same shared data to perform the same computation but, as some of the data (parameters) of this customization are client-specific, said common customization produces different results for different clients.

According to a further aspect, the file transfer system of the invention relies on HDD emulation primitives and establishes and maintains an integrated per-client customization for data areas. Instead of intercepting and modifying a file for client, the invention establishes a private (client-specific) data status, reads the private data at start up or at commencement of a process, writes or copies the customized data with possible changes to a memory location where the data may be read thereafter and used again, and optionally can be arranged to write back the customized data at shutdown. A particularly inventive aspect is that each customized set of data (e.g., customized file) is opened and then caused to establish a customized set of data, using the hard disk drive emulation basic process elements.

An initial read request is made by an operational entity such as a terminal or process or user, to read some addressed part of the client-specific data area. Addressing the desired data could involve stating a volume address, directory/subdirectory tree, file name, directory path, etc. If a similar set of data (functionally similar) exists in the commonly shared data area, the data received in response to this initial read request can be copied in order to logically overwrite the corresponding set of data in the commonly shared data area. Where a copy of this data is to be actually written, it is not necessary written over the commonly shared data. When a write operation is invoked, the write operation can generate a new copy in a write-overlay. The new copy thereafter is maintained as the writing entity's copy for any further purposes. This specific copy is accessed in any subsequent data access operation by the entity whose write operation resulted in the new copy.

On a more basic level, the HDD emulation process that generates the client-specific data can place the data at an address that is cross referenced to the identity of the operational entity, or perhaps an address that includes an identity code of the requesting entity in an addressing string. That is, the written data can be renamed or located in a manner that is uniquely associated with its owner, the operational entity that first wrote the data. Any further read, write, open or other file access procedure by that operational entity is directed to the data that was established to be specific to that operational entity.

The data written by the operational entity to the client-specific storage can be held in volatile storage but further advantages are obtained if at least part of the data specific to the operational entity is held in nonvolatile memory. This enables changes to these data to survive a reboot. According to this aspect, the data can be useful to carry not only identification codes for a process or terminal or user, but also configuration information, security authorizations, passwords, software licensing information, media licensing information, user or terminal preferences, operational history values, etc., as well as other forms of information that at least partially are different for at least two operational entities.

These and other objects are provided according to the invention in a method for operating a data processing network as well as in the corresponding programmed network system, by modifying what could have been a strict shared-disk image in a hard disk drive emulation or other environment in which plural clients share access to an identical set of data (a disk image for instance), so as to support client-specific versions of data, the addressing of which is shareable. According to the invention, the storage space available to the clients by the means of emulated HDD communication includes at least some parts that are rendered client specific by operations that are incorporated in the emulated hard drive emulation system and accomplished without specific attention in each specific client's programming. In other words, the clients can access simultaneously some data (emulated HDD data) for which content and addressing are shared, and at the same time, can access client specific data for which addressing only is shared (two clients can use the same addressing to access distinct client-specific data contents). In the context of the invention, the term "client" can be construed to encompass any operational entity. Examples are a process, a processor, a terminal device, a user, a subnet, a server, or a subset or category of such entities, etc.)

In an arrangement wherein the shared files comprise an operating system to be run on or for many operational entities, or perhaps comprise applications to be provided to operational entities upon initialization or upon demand, the invention can provide substantial efficiency. The commonly shared files can be kept pristine and free of modifications. The commonly shared files need only be stored once (i.e., only one copy) while serving all of the clients. At the same time, the invention can provide substantial versatility. The operational entities (clients) can establish and maintain customized values of various sorts in their client-specific versions of files or directories that are designated initially as shareable, preferably in nonvolatile storage to survive a reboot when the client specific data have changed.

These advantages are obtained without the need to rewrite large portions of the operating systems and applications programs. Only the simple read-file/write-file/copy-file requests, implemented with the system described according to the invention, need to be inserted into the bootstrap load steps and/or into application launch steps. Thereafter the operating systems and applications programs processes simply use their conventional file names for read and write operations. The invention thus provides a way to effectively customize a virtual hard drive for each client, while maximizing administrative control of operating system versions, and appearing to operational entities other than the process(es) that implements the Invention as indistinguishable from systems having a private sole-access hard drive.

The method of the invention can be applied to one or more client processes interfacing with a local memory such as a hard drive, flash memory or optical CD ROM. The method can be applied to distinguish among different users of the same processes. The method can be applied to one or more client terminals in data communication with at least one network server or that are interfaced with identical copies of local memory. In each case, potentially numerous operational entities (clients) can exploit the same shared applications, operating system, tables and other data, supporting the same or substantially different configurations, e.g., by subsets of all users.

If the client reads the client-specific data using the read method according to the invention but did not logically copy it to an overlay that supersedes the corresponding commonly shared data or did not save it anywhere for further use (for instance in a RAM buffer) and an access to the same data is required, the client will have to emit again a read request towards these data, potentially preceded by an open request if a close request was previously emitted. This is why it is usually advantageous to keep a local copy of previously read client-customized data, unless it is certain that no further access to these data will be needed.

A number of variations and embodiments are discussed in the following illustration of exemplary embodiments. However for assessing the scope of the invention, it is necessary to refer to the appended claims.

BRIEF DESCRIPTION OF THE DRAWINGS

The invention is exemplified in connection with certain embodiments and examples as discussed herein and/or illustrated in the appended drawings, wherein.

DETAILED DESCRIPTION

Figure 1:
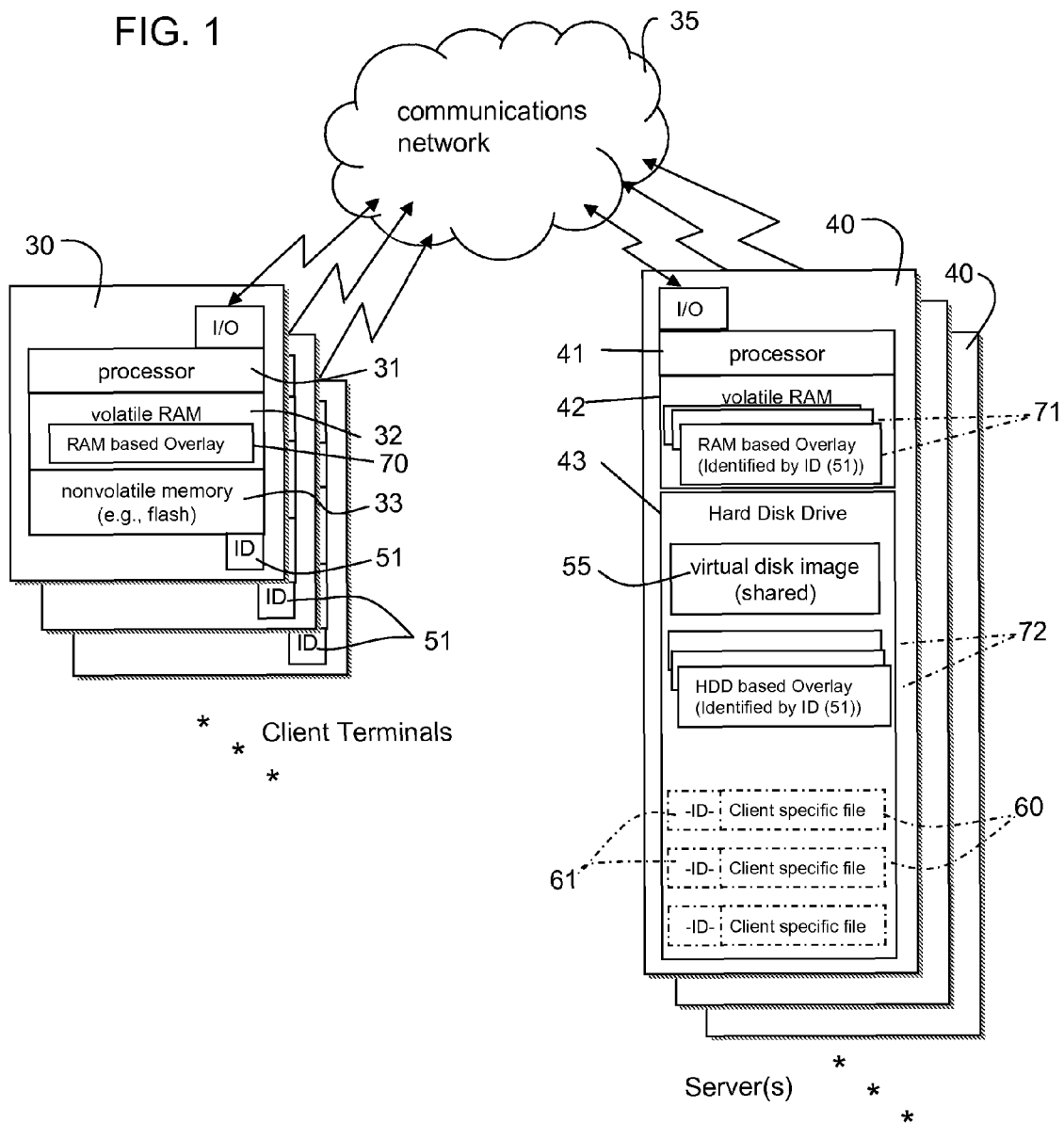
FIG. 1 is a schematic block diagram illustrating a network hard disk drive emulation embodiment according to the invention.

FIG. 1 schematically illustrates an embodiment of the invention applied to a network hard disk emulation embodiment. The invention is applicable to a local hard disk emulation as well, generally shown in FIG. 3, or to a local overlay arrangement, shown in FIGS. 4 and 5

With reference to the network embodiment in FIG. 1, a plurality of terminals 30 are provided at various locations, in data communication with a network 35, shown generally, to which one or more servers 40 is coupled. The terminals 30 and the servers 40 are operational entities that communicate in a standard manner over the network using communications protocols, and in that sense are peers. Functionally, however, the terminals are users of data storage capacity at least via one of the servers 40, which provides access to the client terminals to certain groupings of data on one or more hard drives 42 accessible via the servers 40 using a hard disk drive (HDD) emulation technique.

Figure 3:
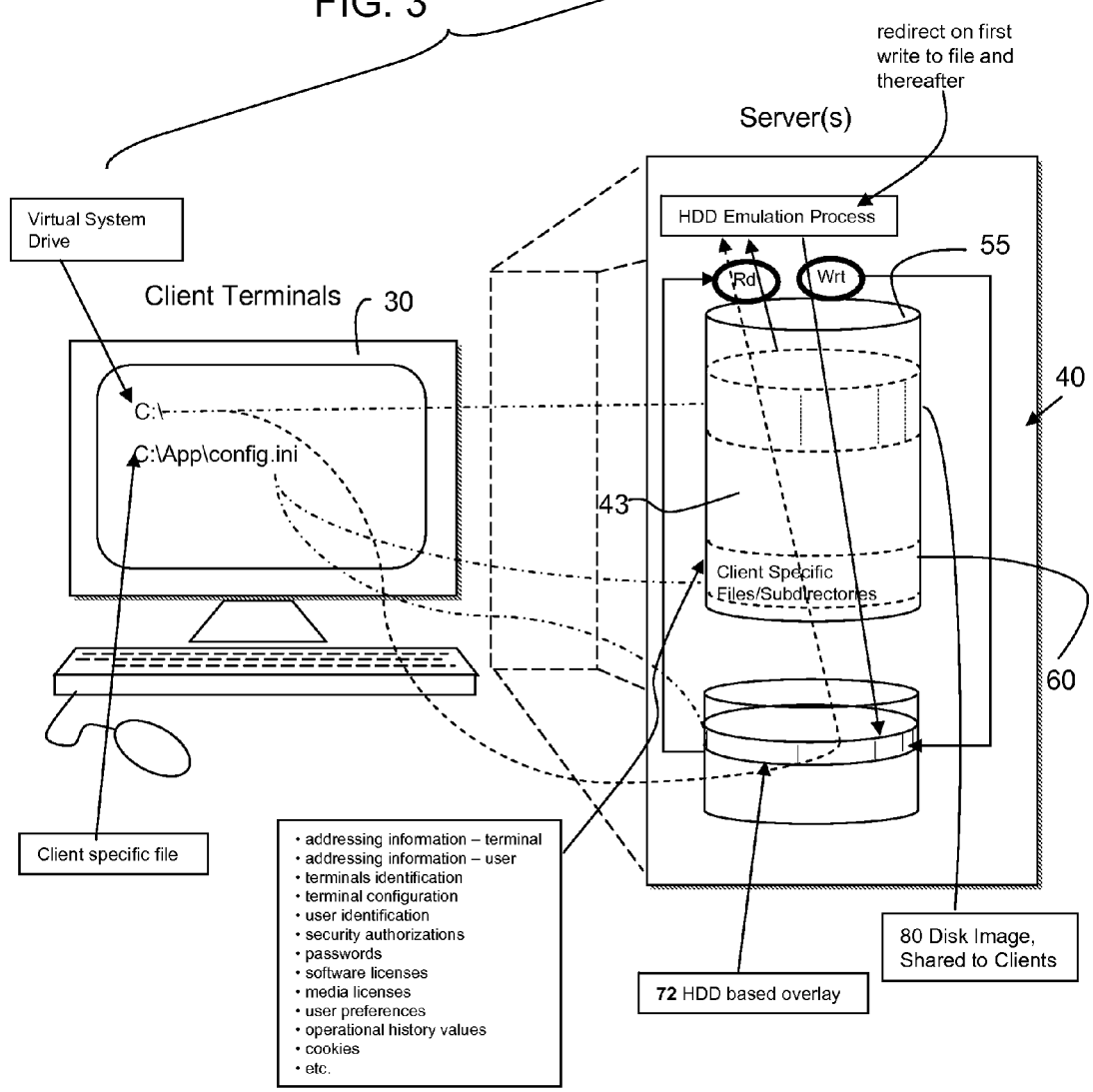
FIG. 3 is a block diagram schematically showing an embodiment of the invention operating on a terminal device.

The network arrangement of FIG. 1 resembles the terminal embodiment of FIG. 3, wherein the operational entities are processes that operate on the terminal device and likewise emulate a hard drive that has shared data files or areas (that are protected against writings, but can generate client specific versions that are accessible for read/write operations but only by their client owner). A write operation to an identified portion of such data areas (e.g., a data sector address or file name or the like) causes the HDD emulation process to spawn a new copy to which the contents of the write operation are copied or written. Once spawned, the new copy is linked to the operational entity that made the write operation. The entity can continue to make read, write, open and similar data access requests, and continues to use the same conventions for identifying the original shared data area (such as the data sector address, file name or the like). However the HDD emulation system serves data access requests made by any such entity with the new copy that was spawned by that entity. The new copy is the sole and exclusive version of the identified data that is made available to the entity under the original shared data area identification. Preferably the new copy is kept in an overlay. The overlay might be made persistent (to last through a reboot or initialization) or it might not (e.g., stored in a volatile memory medium).

All the operational entities can similarly employ the HDD emulation system. Assuming that the operational entities are thin client terminals, for example, all the terminals share the HDD emulation data. Write operations to shared areas generate a set of overlaid data versions. Over a period of time, certain data areas may develop such that every client has a customized overlaid version in the HDD emulation system. However the HDD emulation system does not need or generate wholly or partly redundant copies of data areas that are read by the clients but never written, such as executable program code and static tables.

The HDD emulation aspects and the generation of custom versions of data for distinct operational entities, can be applied to various hierarchies, such as processes running in a terminal device with a memory, terminal devices with network access to a server, users of processes on a terminal, users with log-in access to a network, etc. Assuming a given number of operational entities (e.g., processes, users and/or terminal devices sharing the memory device containing the shared data area), the entities are capable of generating that given number of distinct copies. Until a write operation is first attempted by an operational entity a read operation is served with the commonly shared version. After an operational entity effects a write operation, subsequent read operations by that operational entity (only) are served with the potentially customized distinct version that was previously written by that entity.

According to programming choices, various parts of a data store can be designated as shareable (e.g., program storage files and areas as opposed to data accumulation files). It is possible that the shareable areas can concern terminal or user customization files, but the invention is not limited to customization files and advantageously permits the operation of substantially different versions of applications or operating systems by operational entities that are sharing the same hard drive emulation. The commitment to the changes made in this way can be temporary, i.e., surviving only until a next initialization, reload or reboot when the operational entity reverts to the shared version. Alternatively, the changes can be made more or less permanent by writing to nonvolatile memory device and picking up previously-written potentially changed file upon the next initialization of reload.

In FIG. 1, the client terminals 30 and the servers 40 comprise operational computers, each having a central processing unit (CPU) 31 or 41, respectively, coupled to a typically volatile read/write random access memory 32 or 42 in which machine instructions are stored in addressed memory locations and through which the processor steps or jumps in executing whatever instructions are encountered.

In executing instructions, the processors 31 or 41 read and write to their RAMs 32 or 42. When power is off, the contents of RAMs 32, 42 is lost. Nonvolatile memories 33, 43 are also provided. When initializing (for example when rebooting from a power-off condition), executable instructions are copied or generated from the nonvolatile memories 33, 43 and placed into respective RAMs 32, 42 for execution by the processors.

In many desktop computers, data and software that needs to persist is stored on a nonvolatile hard disk drive. A fresh image of executable code is copied into RAM upon initialization or at some point before the code is to be executed. It is possible to regulate the extent to which changes can be made freely to executable code or other data, for example by setting file attributes that designate a file to be read-only, or simply by refraining in the programming from overwriting the files. It is generally part of the process to read and write freely and it is generally possible to effect many functions of the terminals in a stand-alone operation. There are advantages, however, in the case of network communications which involve sharing of data files with other terminals, users, processes and/or devices.

The present invention is applicable to emulating a hard drive by providing storage capacity at a network server. Memory storage capacity (and potentially also server computing capacity) can be made available to client terminals via network communications as opposed to facilities provided only locally to the terminal, such as by providing a hard disk drive and highly capable programmed processor at each terminal. Thin client computing environments generally exploit this idea of sharing rather than distributing memory and other resources.

The thin client configuration is efficient. The terminal devices need not all be outfitted with extensive storage or processing power, which can be made accessible to the terminals over the network. In an exemplary configuration as shown in FIG. 1, the terminal devices can lack any hard disk drive. It is necessary to provide at least sufficient nonvolatile storage to enable the client terminals to be initialized (rebooted). Therefore, the client terminals 30 are provided with nonvolatile read-only memories 33 (ROM or PROM) containing sufficient code to initiate operations at least as necessary to conduct communications with one or more of the servers 40. In a preferred arrangement, the client terminals 30 have flash memories 33 as their nonvolatile memories available when rebooting. The flash memories can have more or less extensive and more or less embedded operating systems, but at least contain sufficient code to commence operations in coordination with network servers 40. At a minimum, the non-volatile memory contains the terminal firmware (BIOS). If network boot capabilities, embedded network boot capabilities (such as PXE capabilities) are required.

The thin client terminal devices are relatively inexpensive, but nevertheless have an added benefit in that they resist becoming obsolete when faster or more capable hardware becomes available. Improvements can be made at the servers that are shared by many terminal devices.

Thin client terminals might have any function for which they can be programmed, but client terminals that share memory or other resources are likely to be related to one another, for example, as members of an enterprise. The terminals 30 could be, for example, retail point of sale processors of a business, database access terminals, gaming terminals, etc. In such applications, many terminal devices run the same operating system and offer the same applications to their operators. It is efficient to share operational code and parameters for terminals that are running the same applications for their operators. The code is provided by the servers 40 to all the client terminals 30, at least forming a subset of similarly configured devices out of all the devices on the network. Of course a network might support any number of such subsets.

Although the terminals run similar applications, it is necessary to distinguish among the terminals for some purposes. Identification or addressing values need to be specific to terminal devices to enable communication with unique terminals. If contemporaneous transactions are contemplated via the terminals, the transactions of individual terminals must be distinguishable. It may be possible to store data unique to a terminal at a server 40, but in order to communicate uniquely with terminals, each must be separately identified at least by a network address, for instance an IP address, or an hardware address or identifier such as Ethernet (MAC) address or Universal Unique Identifier (UUID). The IP address is typically obtained by an initialization procedure (DHCP). At least a unique machine code 51 is available for each the terminal device. The same machine code or a similar code is made available to the client after a restart.

The terminal identifiers 51 might classify the terminals 30 as members of different departments, or as terminals having particular configurations, or as terminals having some level of authorization rights. Alternatively, the identifiers 51 might simply be serial numbers that are cross referenced to similar classifying information, that is stored. In any event, each terminal has a unique identity for use at least as a communications address or as a code that is cross referenced to a unique communications address.

In terminal application having flash memory for persistent (nonvolatile) storage, the terminal identifier 51 may be stored in the flash memory. The local flash memory can be used to store files and/or tables, factors or similar information that is specific to the terminal or its users. This setup information is useful during initialization of the terminal during initialization of some application to be run, to account for storage of variables that are permitted to differ among users or terminals. However it is inconvenient to change such configuration in flash memory (which is slow to be written), tedious and possibly dangerous to permit variations to be made to each unit of flash memory in each terminal. Such configuration information is typically written to flash memory under special conditions, and only (for example) when necessary to set a parameter value in memory so that the new parameter value becomes active the next time the terminal 30 is rebooted. The invention is also applicable to embodiments that lack read/write memory and for example have a terminal identifier, and BIOS necessary to commence bootstrap loading, stored in ROM.

One objective in a thin client environment may be to operate in much the same way as a fully capable desktop personal computer, even though the terminal unit might not have a local hard disk drive or flash memory (flash disk, Compact Flash, Disk on Module and the like) and may be serving as an interface device. Once a terminal device is initialized and network communications have been established, it is readily possible to share other resources on the network, such as hard drive space associated with a remote network server 40. It is advantageous and convenient if parameter values that need to be saved in nonvolatile storage can be stored a the network server 40 instead of in the flash memory 33 of the client terminal 30, especially when there is no such flash memory in the client terminal 30. This avoids the extra complications of writing to flash and also has other advantages, such as permitting a nonvolatile parameter change to be made and to become effective without rebooting the terminal 30 and centralizing the management of customized values or sets of terminals 30. Having no flash-memory (or minimal flash memory) reduces the cost of the terminal, because the flash is usually the second most expensive component in a thin client terminal after the CPU.

It might be possible to store a disk image at server 40 separately for each client terminal 30, keeping a copy of the full hard drive image exclusively available to that one terminal 30. In a possible thin client network embodiment, memory space could be established on a server to substitute for much of the memory space that might have been used on a local hard disk drive at each terminal to be served. A virtual drive or drive letter or partition or subdirectory could be mounted or mapped for every terminal or even for every terminal operator. The memory space devoted to the terminals in such a system is redundant, because there are likely to be two or more terminals (or users) who perhaps have similar configurations or needs, wherein substantially the same information is duplicated in both terminals' assigned memory spaces. This redundancy is inefficient as to allocation of memory space, and moreover, if an update is to be applied to all the terminals, it may be necessary to make the update repeatedly, for each copy.

Another possibility would be to keep all client specific files and information at the client terminals 30. Storage at the server 40 could be limited to files that are shared identically among all client terminals 30 (or subsets) and cannot be changed. One master copy then is commonly used by plural terminals 30. The files can be made read-only and protected and controlled only by administrators.

However storage of customized files at the terminals is not convenient for the reasons mentioned above. According to an inventive aspect, a balance is to be struck between the need for files that are specific and subject to read/write access, versus the need to reduce the redundancy and complication of storing the same information repeatedly for specific application to individual terminals or operators (or at least individual subsets).

One copy of files that are used by plural client terminals without changes is stored at server 40, which provides a total memory savings in a thin client system versus a system of distributed hard drive terminal systems. At the same time, the client terminals 30 are provided with uniquely stored configuration information files.

In the preferred HDD emulation embodiment, the memory capacity of the server 40 is made to appear as if a local hard drive is available to the client terminal. The open, read and write operations provided by the interface according to the invention and invoked by corresponding steps in the boot or load process are managed by the invention in such a way that the addressing of client terminal read/write operations on client specific data "owned" by a specific client terminal 30 are actually directed towards a private client-specific storage area 60, that is addressed with a client specific code 61 that can be appended or that can prefix the file name that stores these client specific data, or that can be part of the addressing (path) that references the file that stores these client specific data. That code 61 can be the machine identifying code 51 or another code that is cross referenced thereto via a table in the server memory.

Thus, a terminal-specific (or user-specific) revision file can originate when a terminal or user accomplishes a first write operation according to the invention to a client-specific file 60. This file could be a replica of a shared common configuration file that was previously read by the terminal from the common "shared" data in the common emulated HDD data, for example containing default parameter values, or from the overlay-based data. The file can be revised by the client terminal (or by an administrative process acting to alter the setup configuration applicable to the client). The revisions change the setup configuration but are applicable specifically to that one client. In order not to repeat the administration tasks each time, the client specific file can now be saved as a non volatile client-specific file 60. Saving this file is easily done with the invention using the innovative "open" command followed by the standard HDD emulation write command(s). Thereafter, read operations by the respective client for the corresponding file 60 according to the invention can be invoked and a copy of the read file can be made by the client into a write-overlay so that subsequent reads are directed to the client specific version and not the common one. The innovative steps according to the invention make it possible to set programs or scripts so that customized files (that can differ from a client/user to another) are automatically "grabbed" and copied into a client write-overlay, before the data in these files are actually read and used (processed, used in some computation) on the client side. It is then possible to have a specific file of a kind, per client, while the common files are the same and the client write-overlays areas are volatile (erased at each startup, for instance). The computations of the data in each client-file produces different (customized) results while all the client process the same computation steps.

It is possible to reset or erase changes made in this way, for example when a client terminal or a server has an orderly shutdown, or to retrench to a default condition when so desired. This is accomplished by erasing or renaming the client overlays, and/or specific files or storage areas, or by copying the common configuration overlay or file over one or more client specific files.

Figure 2:
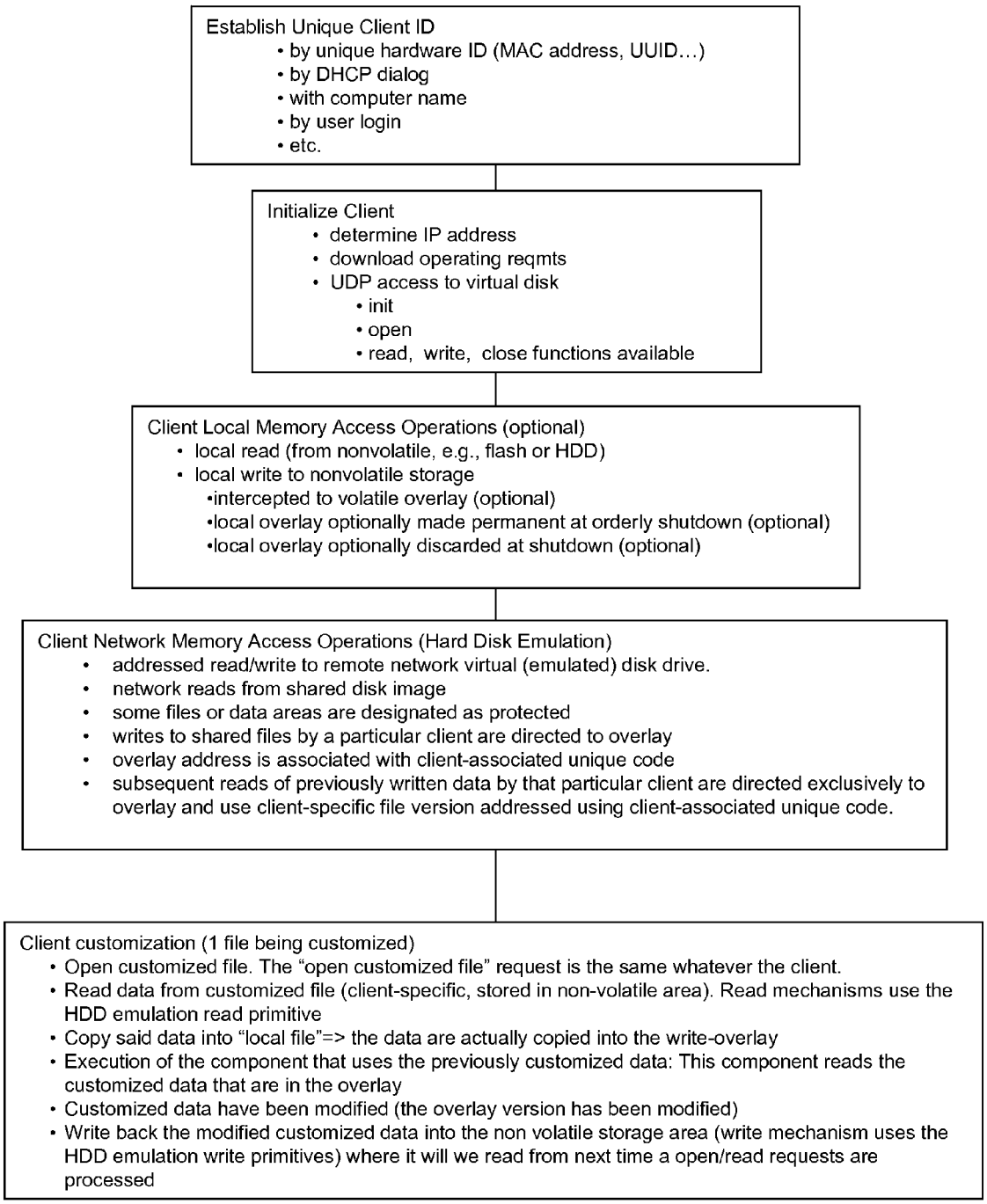
FIG. 2 is an operational chart showing successive operational steps.

The operation as described to share common files and to invoke the necessary steps in order to establish overlaid client specific versions of particular files when needed, is illustrated in a tabular manner in FIG. 2.

Figure 4:
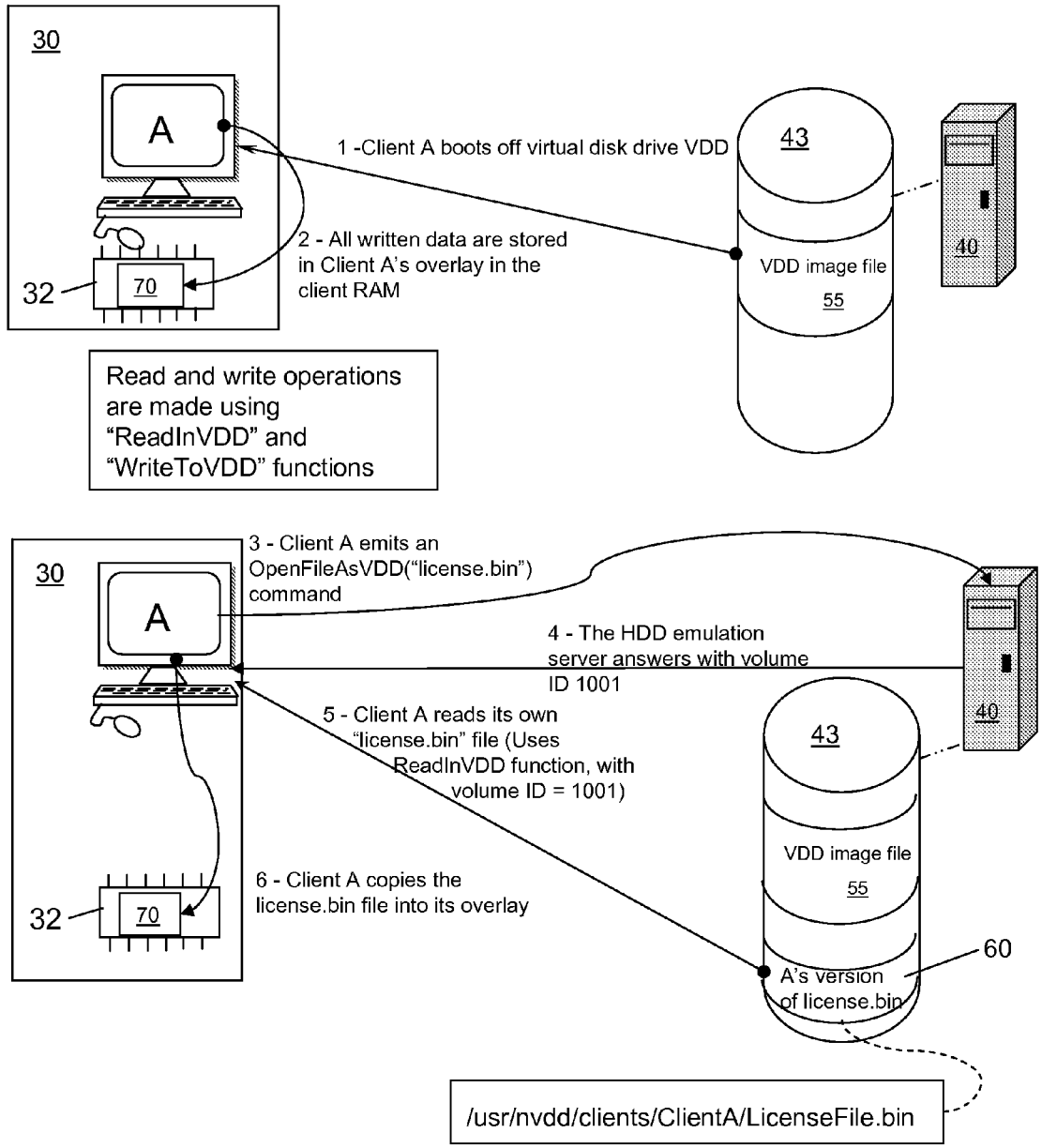
FIGS. 4 and 5 are schematic illustrations of sequential data processing steps according to a practical application of the invention.
Figure 5:
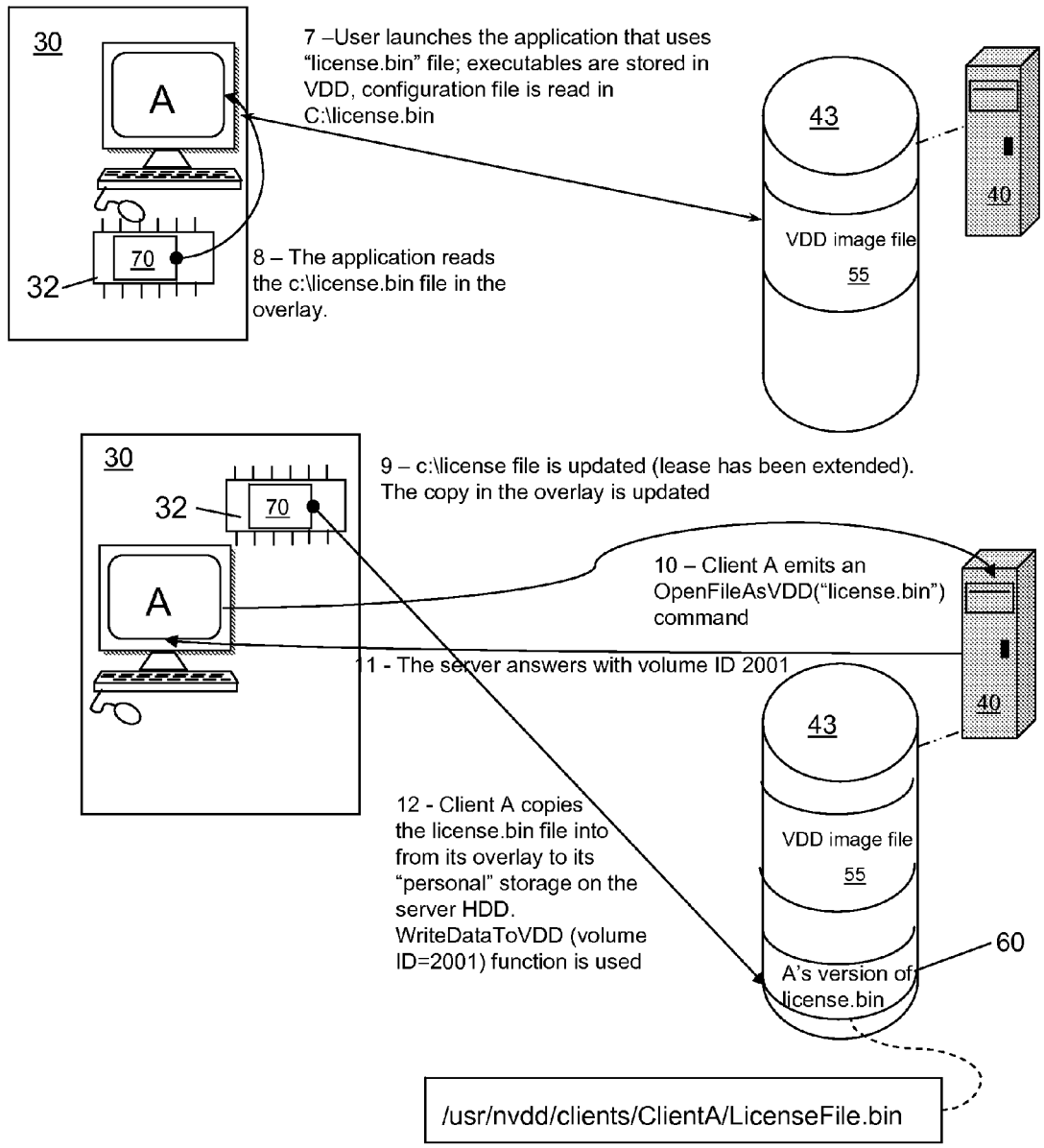

The operation of the invention as described, using a local possibly-volatile memory device for holding an overlay, is shown in FIGS. 4 and 5. In this embodiment, the terminal device might have various kinds of associated memory but only needs to have BIOS/firmware storage sufficient to establish network communications through a network interface device. Bootstrap loading proceeds from the virtual disk drive on the network.

The extra steps added to "grab" and copy customized files as well as the file naming or other user identification functions advantageously are transparent to the user and user processes.

The file always is addressed for read and write operations in the same original way, using conventional name and address identifiers, i.e., the common name that is also used by other users and processes. The function that makes it possible for the "Open" step (a first of certain steps that use the invention) to actually open a customized file and get a handle on it, can be invoked in a unified client-independent way: All the clients can use the same code (OpenFileAsVDD("MyFile")) to open "their" customized version of the file named "MyFile." In this way it is possible to embody the extra steps that use the invention in the storage area shared among all the clients.

The Open command according to the invention opens a file "as if" it was a virtual (emulated) drive. Then commands to close the file, read and write data in the customized file use the same commands as the HDD emulation commands. As a result, the features according to the invention are usable very early in the boot process of a client machine, making it conveniently possible to customize components that are loaded very early in the boot process, such as security related files, for instance; furthermore, this kind of customization does not need a reboot to be taken into account An implementation of the extra function "OpenFileAsVDD" is usually the only function that has to be added to the set of functions that comprise the HDD emulation protocol. Furthermore, this OpenFileAsVDD function can be easy and straightforward to implement: The process(es) that implement this function usually access the virtual disk drives data as files (disk drive image file or devices object that can be logically considered as files), so opening a new "Virtual Drive That Is Actually A Customized File" is readily implemented when the HDD emulation functions are already provided by said process(es).

The "user" may be deemed to refer generally to operating software processes at multiple terminal devices that are considered the users, such processes including applications and systems programs. The user processes need not involve direct human activity, although such activity may be involved. If the invention is applied to multiple processes as the users, the processes could be plural processes that operate in a single terminal device, but generally each terminal device is considered a distinct user, identified, for example, by a terminal name and/or network address.

From the user or terminal perspective, the point is to provide a client terminal 30 that substantially emulates a hard disk drive system, as shown in FIG. 3, having the same sort of volatile and nonvolatile memory capabilities such as an apparent system drive (C:\), that might point to an HDD image that is in fact accessed through server 40 and not locally, and contains client specific files 60 being addressed according to client referenced codes 61. These client specific files would have been usually previously copied into the appropriate write overlay through the use of our innovative file transfer technique.

The invention supports operational system changes that are specific to an operational entity, and can coordinate with processes that distinguish between changes that are to persist in nonvolatile memory versus changes that are to be established and to persist only up to a system shutdown at a terminal or at the server. Accordingly, the invention is particularly useful with changes to operational parameters made in thin client terminal systems. The invention is also applicable to establishing a read/write emulation starting from an inherently read-only operational system, such as an operating system image stored on an optical ROM. Some extra "write" steps according to the invention can be inserted in the shutdown of the client or stop sequence of a process. These "write" steps make it possible to save a previously modified customized file. The creation of said customized file can be done by said write steps: The innovative OpenFileAsVDD function can open a customized file if it does not exist yet: An empty file can then be created. The handle on this file makes it possible to write data to it. The creation of customized file can then be made by these steps:

```
FileHandleAsVDDHandle=OpenFileAsVDD(<FileName>)
LocalFileHandle=OpenFile(<LocalFilePath>);
AllocateBufferInRam(BufferAddress, SizeOfFile(LocalFileHandle));
ReadFileDataIntoBuffer(LocalFileHandle, BufferAddress,0 ,
SizeOfFile(LocalFileHandle));
WriteBufferToVDD(FileHandleAsVDDHandle, BufferAddress,0 ,
SizeOfFile(LocalFileHandle)));
CloseVDD(FileHandleAsVDDHandle);
```

In the example above, the functions ReadFileDataIntoBuffer and WriteBufferToVDD expect an integer as their third parameters representing the "file position" or "Buffer position" (position=offset) from where the data must be read/written from/to. In our example and usually whenever the VDD read/write functions are used to read/write data to files "as VDD", the "position" will be 0 (start of file or buffer) and the size of data to be read/written will be the size of the customized file. Note that the function used to actually write data to the customized file is WriteBufferToVDD, the very function used to send "to-be-written" data from a memory buffer to a VDD.

The invention can be considered a method, a programmed network configuration involving client terminals and servers, and/or a programmed data carrier containing a software process that effects the foregoing technique. As a method for operating a data processing network, the invention includes the steps of coupling to a data communication network 35 a plurality of client terminals 30 and at least one network server 40. A data store 42, 43, 55, 60 is maintained in a manner including portions 55, 60, 71 (optional), 72 (optional) that are accessible to the terminals 30 via the network server 40. The server 40 may have its own processor 41, RAM 42, and disk drive areas in one or more hard drives 43 (or other mass media storage devices) as needed to serve other functions of the server. For purpose of the present invention, the pertinent server functions relate to emulating operation of a hard drive for the client terminals 30 in a manner that minimizes redundancy in data storage by keeping and sharing among the client terminals those data, files (or directories or other data groupings) that remain the same for plural terminals, and generating or maintaining terminal-specific copies 60 potentially copied into write-overlays 70, 71 or 72 for subsequent access only by or for those respective terminals whose files or other data groupings may have diverged from the shared common contents, by virtue of a read operation of the data in client-specific data 60, said data having then been copied to the currently active write-overlay 70, 71 or 72 subsequently to a client-initiated write operation.

At least portions of the server storage area 43 (e.g., hard drive) are addressable during file-read, file-write, file-open and/or file-close operations from the client terminals 30. This addressing could be by defined sector or by a logical cross reference to a known location on the drive, such as by using one or more data identifiers unique to any (or all) of a file, subdirectory, directory (possibly as affected by a preliminary PATH command that determines a search order), mapped drive identifier, partition and volume.

In this addressable storage area (see FIG. 1) are located shared files 55, preferably as a virtual disk image arranged in one or more of the foregoing data groupings (file, subdirectory, directory, mapped drive, etc.), permitting the files therein to be read by the client terminals 30 over the network 35. A plurality of the client terminals 30, if not all of the client terminals, are authorized to effect read and write operations on at least one of said data groupings shared in common by the client terminals. For example, the client terminals may be authorized to read and write all the files or only those files intended for a subset of terminals of which the relevant terminal is a member of the subset. In this way the terminals 30 can each be connected to the operating system appropriately as to their type or function.

All the terminals 30 having a given type or function can share the same virtual disk image. The shared virtual disk image preferably comprises most of the operational routines, tables and parameters to be employed by terminals 30. The client terminals 30 address the data store using a same data identifier (e.g., VDD identifier, file name, directory name, subdirectory name and tree, etc.) to effect said read and write operations to the shared one of the data groupings. However, at least certain of the files available to the client terminals 30 via the server 40 are or can be made to be specific only to a particular client terminal, identified by the ID 51 associated with the terminal 30 using a specific file ID 61 (or subdirectory or directory ID, etc) associated with a client specific data file 60 (or subdirectory or director or other data grouping).

According to an exemplary technique, this result is achieved by processing read and write operations attempted to the data store 43 by members of the subset of client terminals 30, for at least a target one of the data groupings. The target grouping can be, for example configuration file tables or subdirectories containing configuration information. An apt example is file registry information.

The address or data identifier (e.g., directory tree and file name) that is normally used by client terminals 30 to access a particular file or the like is processed in a manner that is client specific. This operation may comprise modifying the storage area addressed for a write operation to make such an area one of the overlay dedicated to the client terminal 30, Local RAM Overlay 70, server based RAM overlay 71, or Server HDD based overlay 72. The overlay area is kept unique to a given said member attempting at least said write operation, so as to use the corresponding overlay (storage area). In this way, the write operation is made to access one said data grouping that is unique to said client member of the subset. In subsequent read operations for the same address or data identifier, the respective client member's overlay area is again used.

The customized files are copied into one of the foregoing overlays when they are read and are usually read from one of these overlays when they are read and written back. During a write operation to a customized file, the client issues an OpenFileAsVDD command, specifying a file name. The actual address of the file that is opened as a VDD (Virtual Disk Drive) is computed by the server process. For example, if the client issued the request OpenFileAsVDD("configtable.dat"), the server can actually open the file "configtable-45789.dat" where the distinguishing ID "45789" is or is cross referenced in server's memory to the client terminal ID 51.

The foregoing method is useful, for example, in a network of thin client terminals wherein the client terminals 30 may be flashless or coupled to flash memory ROM 33 and it is therefore inconvenient or even impossible to write to the nonvolatile memory. In the case of flash memory, an orderly shutdown and reboot is usually required at least, before any changes become permanent in nonvolatile memory. According to the invention wherein client terminals (or perhaps only certain processes) are initialized by downloading operating system files from the shared data store, it is not necessary to reboot to effect configuration changes that can immediately be made "permanent" by writing into nonvolatile memory, namely the hard drive 43 of the server 40.

The data groupings (e.g., virtual disk drive image, files, subdirectories, etc.) that are shared in common by the client terminals 30 preferably include selected configuration values obtained by the client terminals during initializing steps. It is also possible to employ the invention for classes of files other than configuration files. For example, a particular client terminal might be configured to read and modify code representing an executable process, and in so doing generate a version that is specific to the client. The invention is most efficient, however, when the client specific files 60 are used sparingly, preferably for configuration values such as selection among setup alternatives that may apply to the client terminal.

According to respective embodiments, the client specific files can be provided by a server process as part of a log-in procedure that would include at least one call to the function OpenFileAsVDD. In reply to the reception of an innovative request "OpenFileAsVDD," the server hard drive area 43 can be searched for an existing configuration file (or other client specific file) for a given client terminal ID 51 when communications with a terminal commences. The next steps usually comprise reading, from the server, the data that comprise the customized file and copying said data into the corresponding overlay (70, 71 or 72). Said data will then be used in lieu of to the shared file data for the respective client. If no customized file exists that correspond to the OpenFileAsVDD request, no data are copied into the corresponding overlay, and the client terminals default to the shared file name, usually automatically. In that case, a client specific file may be originated only if and when a write attempt is made by an identified client terminal to a customized file previously opened by an OpenFileAsVDD request. A configuration file name or other name can be provided in a short lookup table list available to the server 40.

A file name or file type is apt for use as a client specific file or type, if used to contain configuration values that advantageously differ from one client terminal to another. (The same considerations also could apply to client-specific subdirectories, directories, drive mappings or other data groupings). A longer list of possibilities for client specific file contents comprises addressing information unique to one of the terminals and users of the terminals, terminal identification values, terminal configuration information, user identifications, security authorizations, passwords, software licensing information, media licensing information, user preferences, and operational history values, which may be at least partially unique to one of said terminals and users of the terminals and is used in customizing operation according to an operating system or software application. Other possibilities for use of client specific file types should also be apparent in view of this discussion.

As discussed with respect to the foregoing embodiment, modifying the data identifier for the write operations generates a new file that the read/write/open process may distinguish under a distinctly modified or cross referenced name (or directory name, etc.) such that writing the file produces a distinct new copy of the data grouping (e.g., file) that is unique to said member of the subset and is distinguishable by the read/write/open process. It may be necessary in the case of a data grouping other than a file name to attend to creation of the necessary directory tree entries, etc. Although the process can distinguish in this way, the clients are not involved, and simply attempt read and write operations involving the originally named files and directories.

In a preferred arrangement, at least a subset of terminals are thin client terminals. The thin client terminals might initiate from ROM or from flash or other PROM. Alternatively, in an arrangement where the clients are perhaps not so thin, the invention can be applied to a case wherein the clients may have local storage (hard drives, flashdrives) or other aspects, but simply are arranged to take advantage of the efficiencies made available by sharing parts of a virtual disk image and establishing client unique replicas or copies as to other parts as described.

In the exemplary embodiments, the client terminals are initialized at least partly from nonvolatile local memory having limited memory-write access (e.g., only firmware/BIOS). In that case, the local memory can contain the terminal identification code 51 or other code unique to a respective terminal, to be used in accessing the customized data. A terminal identification code also could be obtained by other means such as a hard wired jumper pattern defining a code, or an ID determined from a related hardware item such as the serial number of a modem or network interface card that may likewise provide a code that is unique to the client terminal 30.

In another embodiment, the terminals 30 may be initialized at least partly from nonvolatile local memory having limited memory-write access (such as flash PROM), and the information stored in the local memory that is unique to a particular terminal may actually identify and distinguish among users of said particular terminal. Thus, using a particular terminal, different users may be provided with distinct configuration parameters. In this way, a given user might be permitted to access configuration files via the server that are specific to the user or are useful for obtaining information unique to the particular terminal and user.

In a thin client environment or diskless computers environment, the terminals may be bootstrap loaded in stages. A first stage executes a locally stored software procedure having routines that commence network communications with a server. A second stage executes routines for commencing operation of software procedures that are one of obtained via the server or executed at the server. In each case, the availability of both standardized common shared files or other data groupings, and also client specific files at least for constants and configuration choices, facilitate system operations and reduce storage redundancy.

The configuration values that are stored and are made changeable according to the invention, can be changed using processes accessible to users of the terminals or processes accessible to an administrator, or both. This optionally may include authorization/permission steps in an arrangement where a user is authorized to change configuration values for a terminal that the user is operating. Similarly, configuration values might be defined for another terminal on the network that said user is administering.

FIG. 3 demonstrates the hard drive emulation aspects of the invention in a functional way. The method of the invention facilitates network emulation of a hard disk drive system for a client terminal 30 coupled in data communication with a network 35 having at least one server 40. This is accomplished by providing at least a group of the client terminals (one being shown in FIG. 3) that shall employ a predetermined subset of common files 55 obtained from the server 40, which maintains a virtual hard disk system. The common files are obtained either upon initialization of a client terminal 30, or upon demand for said common files 55 by the client terminal, or both. All the client terminals in the group operate using substantially the same said subset of common files addressed by all the client terminals in the group, said files being preferably grouped in a Virtual Disk Drive image, using like identifiers for addressing the common files. There may be any number of such client terminal groups with their own common files, potentially supported by the same server. And according to the invention, one or more of the files can be made into a client specific file 60, either temporarily or permanently, by operation of the write functions of the virtual disk server process implementing the OpenFileAsVDD function, by which the server 40 serves the client terminals 30.

At least one data portion in the subset of files is to contain values that shall be subject to alteration by operation of the client terminals. This portion can be, for example, one file containing configuration parameter values. The data portion is addressable, e.g., distinguished by a data portion identifier such as a file name (and optionally offset in the file), directory location, volume identifier or similar address.

Apart from the method, the invention may be considered a network arrangement, especially a thin client or diskless computer network system, that is configured and programmed to carry out the method. The arrangement comprises at least one server having access to a data store containing at least one virtual disk drive image containing an installed instance of an operating system software, shared by terminals coupled to the server over a data communications network, a plurality of user terminals coupled to the server, constituting at least a subset of all terminals coupled to the network, wherein the user terminals include nonvolatile memory from which the terminals are initialized at least to a point of establishing network communications with the server, said communications being conducted under a unique terminal identification code. A virtual disk, usually a binary file that contains a byte per byte copy of an actual hard disk drive, containing the installed operating system that runs the terminals is operable over the data communications network between communications processes of the terminals and of the server, said virtual disk providing access to a same shared operating system image for a plurality of the user terminals. The communications processes provide access to terminals reading from the data store, employing the operating system stored in the virtual disk drive image shared by the terminals, until an OpenFileAsVDD function is processed by the terminals and subsequently generates a corresponding request that is sent by the terminals to the server, whereupon said function makes it possible to read the data in the terminal specific file and to copy said data in the "terminal specific VDD" based overlay (70, 71 or 72) and subsequent read and write operations by the given terminal for the given identified file are directed by:

the communications driver processes to the ClientRAM based overlay 70 or the communication "server" process to the Server RAM based overlay 71 or the communication "server" process to the Server HDD based overlay.

The invention has substantial advantages to ameliorate difficulties that arise when trying to arrange a network data processing system having many computers or terminals that operate substantially the same processes, especially when no local persistent storage (such as hard disk drive, flash-disk drive etc) is available to said computers or terminals. Preferably, for data storage efficiency, the terminals or clients use the same "logical" system disk and all use parallel addressing techniques (e.g., the same file names and paths, etc.) to address stored data, especially client-specific data. In this respect, "data" includes all forms of stored information, executable or tabular or otherwise.

In the case of a thin client network, a system disk image is disposed at a server 40 and advantageously is used for the client terminals to bootstrap load from the contents of the system disk image. The server might be simply another network terminal, but is one that is equipped with a persistent storage (HDD, SAN or the like), network interface and operating processes as described herein. The network might be a LAN or WAN or the Internet. According to one embodiment, the virtual networked system disk is shared to the clients using the Neoware, Inc. NVD protocol (Network Virtual Disk).

This NVD protocol is basically a Disk-Over-UDP protocol. In particular it implements read and write functions on a virtual disk. The read/write functions could specify a starting sector and a number of sectors to read or write. Alternatively, the read/write functions can use other addressing particulars. The existing NVD protocol has "open" and "close" functions to implement certain mechanisms that alleviate certain problems with having plural terminals accessing the same logical disk drive. For example, multiple client terminals can use the same virtual hard disk drive (HDD) at the same time, provided that they "open" the HDD image file in a "Read-Only" mode. When opened for read-only access, the file contents can be read as most recently written, but there is an issue due to the order and timing of write operations. Without coordination, there could be a risk of one process overwriting changes made by another process. For that reason, it is difficult to maintain a configurations file that will permit any of multiple terminals to write any changes without reserving the file against access by other processes to enable a write operation, and thus making the file inaccessible to other processes.

It is a relatively slow operation actually to write to a flash PROM, for example as used to initiate bootstrap loading of a thin client terminal. In an embedded operating system thin client arrangement, information that is stored in the flash PROM of a client terminal may be arranged to be read from and virtually written to a disk. However, when the information is written, the new file information actually is directed to an overlay in RAM (that can be a Ramdisk). Should a read operation then occur for the same file, the operation is directed to the overlay instead of the flash PROM. This enables the client terminal operator and the terminal processes to read from and virtually write to the PROM. Such virtually written information is lost at the next shutdown, or an orderly shutdown process can be invoked to reload and overwrite the PROM. This requires at least one rebooting operation before the client terminal can be initialized from information that is "permanently" written to the flash PROM.

A network level virtual disk protocol shares a nonvolatile hard drive among plural client terminals. In such a system, a write operation also might direct client terminal write operations to a write-overlay area. If subsequent attempts to the same information are processed by reading from the overlay instead of from the disk, the same results are achieved with the virtual disk as with the flash PROM. The contents of the overlay can be lost when the client terminal is next powered down or rebooted. This technique is particularly advisable in a network virtual disk. In order to keep a clean installation and stable operational processes, the administrator usually wants all overlay files to be erased when the client reboots. As a result, changes made by or from a client terminal during an operation session are usually lost when the client reboots.

According to the present invention, provisions are made for data that advantageously or in some cases absolutely must be different for each client or at least be different for at least two clients, even though the clients boot from the same virtual disk image. Examples of data that must or should be differentiated are described above, e.g., the client terminal name, a fixed IP address if any, license files. Typically DHCP sets an IP address at initialization, but even in that case it is necessary to have at least a unique client terminal identifier to report under the DHCP protocol. Other categories advantageously are potentially unique, such as choices and configuration parameters, remembered passwords and the like. Still other categories might be helpful if stored through rebooting cycles, such as temporary files, cookies and the like, but also can be reasonably omitted. Problems arise if one attempts to use virtual hard drives or substantially read-only flash memories to store changeable but advantageously unique client terminal values.

One embodiment of the invention includes an addition to the Neoware Network Virtual Disk (NVD) protocol. In addition to the NVD messages that can open/close a virtual disk (OpenVolume, CloseVolume) and write/read sectors in the virtual disk, an operation is added to open a file (as opposed to a volume). The command (OpenFile or OpenFileAsVDD) can open a file that is not on the virtual disk. However the file is accessible to the server (to the server module that shares the virtual disk). This arrangement is shown schematically in FIG. 3.

The standard OpenVolume message in NVD protocol works on a volume ID (a number) that represents the volume internally (the internal Volume ID for the server). The messages Read, Write and Close use a volume ID. The corresponding operations are actually made on the related volume, namely the virtual disk image file, a data grouping that shall be common to several client terminals. When a client issues a message towards a volume, it uses the internal volume ID that the server has sent at initialization phase.

The OpenFile operation works with a file name. The message OpenFile can return an ID code (FID) that can be used as a volume ID, namely a data grouping identifier as used above. If an OpenFile instruction is sent by a client terminal and an FID is returned by the server process, then a message Read (FID) is valid and will read the client specific portion, i.e., the correct file. The same happens for Write and Close commands. Read, Write and Close commands are the same commands that are usually used with Volumes IDs instead of File IDs In the foregoing way, when a client issues an "OpenFile" to the server, the server actually opens the file that corresponds to a name and the requesting client. Thus, two clients who simultaneous direct requests to the same file name (e.g., OpenFile("LicenseFile.bin"), actually will open two different files, namely the files with the noted name as modified by the FID.

In an example partially illustrated in FIGS. 4 and 5, assume that a ClientA sends OpenFile("LicenseFile.bin"). The server actually opens /usr/nvdd/clients/ClientA/LicenseFile.bin and returns to ClientA the file ID 1001 (for example). Then if another client named ClientB sends the same OpenFile("LicenseFile.bin") request, which uses the same file name, the server actually opens /usr/nvdd/clients/ClientB/LicenseFile.bin and return to ClientB the file ID 1002. ClientB may then attempt a file read operation, e.g., "Read sector #63 in LicenseFile.bin." The client actually sends "Read sector #63 in volume 1001" and the server actually reads sector #63 in usr/nvdd/clients/ClientA/LicenseFile.bin. Similarly, if ClientB sends the message "Read sector #63 in LicenseFile.bin", then Client B actually sends "Read sector #63 in volume 1002", and the server actually reads sector #63 in /usr/nvdd/ clients/ClientB/LicenseFile.bin. Of course, the point is that the contents of ClientA's file LicenseFile.bin can be different from the contents of ClientB's file of the same name being made into different files by operation of the invention.

The invention can be used in conjunction with a "semi-volatile" feature, whereby it is optional to cause client changes to client specific files to become permanent upon an orderly shutdown or to discard the changes and revert again to a version in a common shared file or a previously created client-specific file.

The server can be arranged to "recognize" each client according to different client classes. Part of the recognition may provide for the server to use different information as the client ID for different sorts of client terminal. Any client ID should work if unique to one terminal on the network, such as a MAC address (hardware Ethernet address for instance), a unique name (Unique NetBIOS name), a unique IP address etc. As discussed, the terminal and its users can both provide distinct identities.

The invention is also is applicable to other HDD emulations systems. For example, the invention can be used when an HDD image is stored on a CD-R or a DVD-R. The process in charge of "choosing" the correct file would then not be a "server" (because there is no server in this case) but one of the drivers in charge with the emulation itself, i.e., the driver that actually reads and "write" sectors.

The invention has been disclosed in connection with a exemplary embodiments that demonstrate the invention and its representative functions. The invention is not limited to these examples. Reference should be made to the appended claims rather than the discussion of examples in order to determine the scope of the invention in which exclusive rights are claimed.

What is claimed is:

1. A method for operating a data processing system, comprising:
   maintaining a data store accessible to a plurality of operational entities capable of processing contents of the data store;
   denoting at least one part of the data store as a shareable part;
   supporting read operations from the data store to the operational entities and supporting write operations attempted from the operational entities to the data store, wherein the operational entities use a predetermined method for selection of portions to be read and written from/to the data store, including said shareable part of the data store, said predetermined method including specifying an identification comprising at least one of a name and address for identifying the portions selected; wherein a plurality of said operational entities use the same said identification according to the predetermined method to identify at least one selected part of the data store to be read and written;
   generating a copy of said selected part of the data store only upon receiving a write operation request from a given operational entity, said copy being identifiable by a unique identification associated with said given operational entity; and,
   establishing a version of said selected part of the data store for said copy, said version being specific to the given operational entity and subject to customization independently and exclusively of other versions that are established for and served to one or more other said operational entities that likewise use the same said identification.

2. The method of claim 1, comprising storing information in the entity specific version at least one of configuration, identification, preference, authorization and status data enabling independent and distinct computation by the given operational entity versus other said operational entities, and further comprising providing coding for said computation in the data store, wherein the coding is executed commonly by the operational entities and the information in a respective said entity-specific version for a plurality of the operational entities customizes said computation for respective said entities while commonly executing said coding.

3. The method of claim 1, comprising providing a shareable part and a read-write part in the data store, and maintaining said entity-specific versions in the read-write part.

4. The method of claim 3, wherein at least part of the read-write part of the data store is in volatile memory, and further comprising storing at least some data specific to each operational entity in a read-write part of the data store that is in non-olatile memory.

5. The method of claim 1, wherein the operational entities comprise at least one of client terminals, network terminals, processes operating on at least one of said client terminals and said network terminals, users of one of the client and network terminals, and processes invoked by said users.

6. The method of claim 1, comprising accessing the data store for at least said read and write operations through a driver process associated with a corresponding one of the operational entities.

7. The method of claim 1, comprising accessing the data store for at least said read and write operations through a driver process associated with a server responsive to one of the operational entities.

8. The method of claim 1, comprising accessing the data store for at least said read and write operations over a network communication path such that the data store is remote from a corresponding one of the operational entities.

9. The method of claim 1, wherein the convention for addressing said contents comprises at least one of sector identification, file names, directories, directory trees, mapped drives and volumes.

10. The method of claim 1, wherein said write operations in the operational entities specific storage area(s) and serving said read operations of data in the operational entities specific storage area(s) comprise establishing and employing a distinct file address for distinguishing data written by and thereafter potentially read by said one of the operational entities.

11. The method of claim 10, wherein the distinct file address contains an identifier associated with said one of the operational entities.

12. The method of claim 10, further comprising maintaining and referring to a cross reference table associating distinct file addresses with respective said operational entities.

13. The method of claim 1, wherein the write operations and the read operations of data previously written in one entity-specific part of the data store contain at least one of terminal identification values, terminal configuration information, user identifications, security authorizations, passwords, software licensing information, media licensing information, user preferences, and operational history values, which is applicable to one of said terminals or users of the terminals and is used in customizing operation according to an operating system or to a software application.

14. The method of claim 1, wherein the data store is associated with a terminal device.

15. The method of claim 14, wherein the terminal device has one of plural processes and plural users, constituting said operational entities.

16. The method of claim 1, wherein the data store is associated with a network server.

17. The method of claim 16, wherein the network server is in data communications with terminal devices having one of plural processes and plural users constituting said operational entities.

18. The method of claim 17, wherein the operational entities initiate at least one of an operating system and an applications program by downloading data from the data store associated with the network server.

19. The method of claim 1, wherein at least one of the operational entities initiates at least one of an operating system or an applications program by reading data from a storage medium coupled thereto.

20. The method of claim 1, further comprising upon receiving said write operation from said given operational entity, opening a specified file as a virtual disk drive, wherein a distinguishing identification of said specified file is cross referenced in said data store to the unique identification of said given operational entity.

21. The method of claim 20, further comprising directing subsequent read and write operations to said version of said selected part of the data store.

* * * * *

UNITED STATES PATENT AND TRADEMARK OFFICE
CERTIFICATE OF CORRECTION

PATENT NO. : 8,332,370 B2
APPLICATION NO. : 11/382304
DATED : December 11, 2012
INVENTOR(S) : Yves Gattegno et al.

Page 1 of 1

It is certified that error appears in the above-identified patent and that said Letters Patent is hereby corrected as shown below:

In column 27, line 17, in Claim 4, delete "non-olatile" and insert -- non-volatile --, therefor.

Signed and Sealed this
Ninth Day of April, 2013

Teresa Stanek Rea
*Acting Director of the United States Patent and Trademark Office*